Oct. 25, 1966
E. H. WOODS ETAL
3,280,760
CABLE SUPPORTED LOAD DIVIDER
Filed Dec. 11, 1964
2 Sheets-Sheet 2
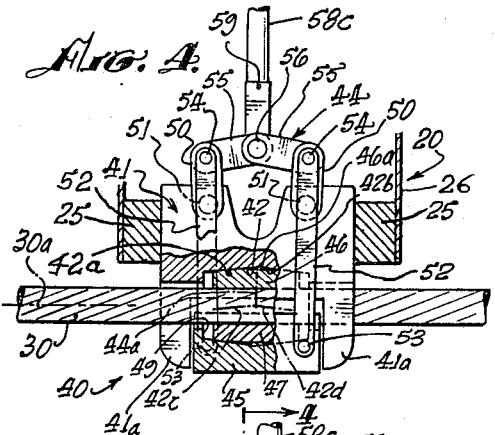
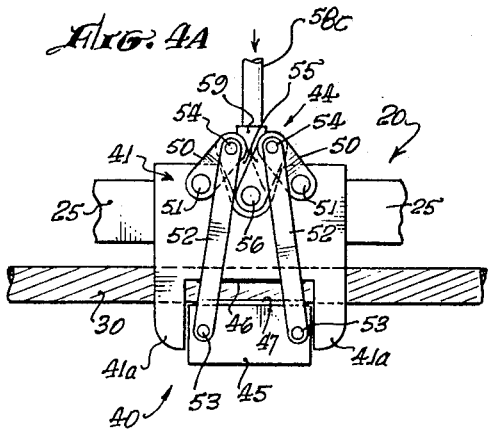
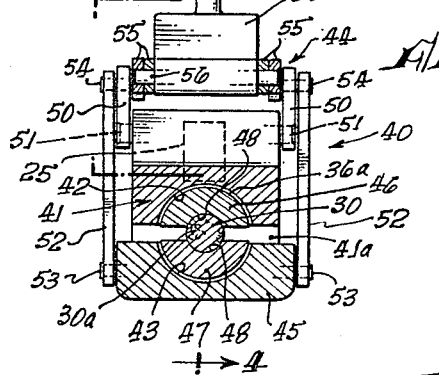
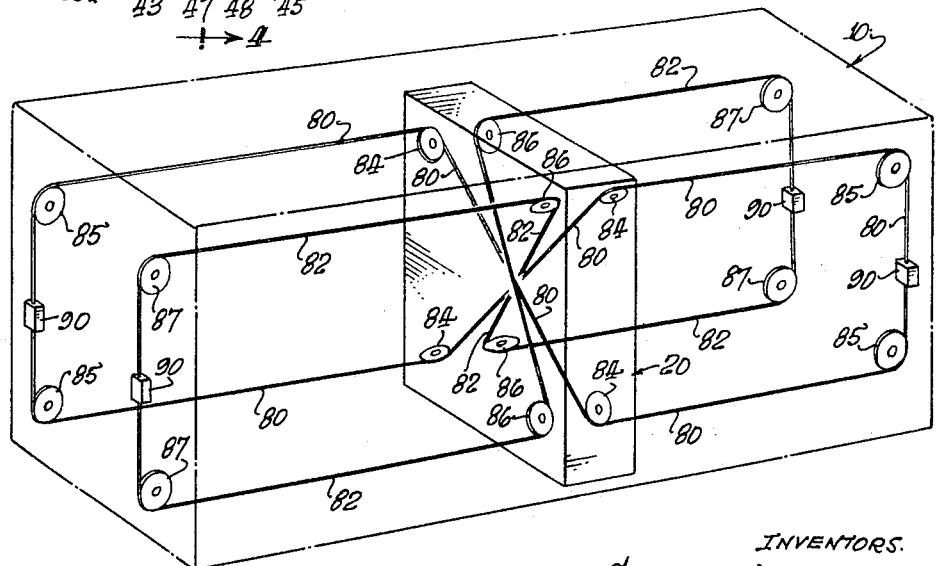
INVENTORS.
EDGAR H. WOODS,
JOHN W. ERICKSON,
By Barkelew & Lewis

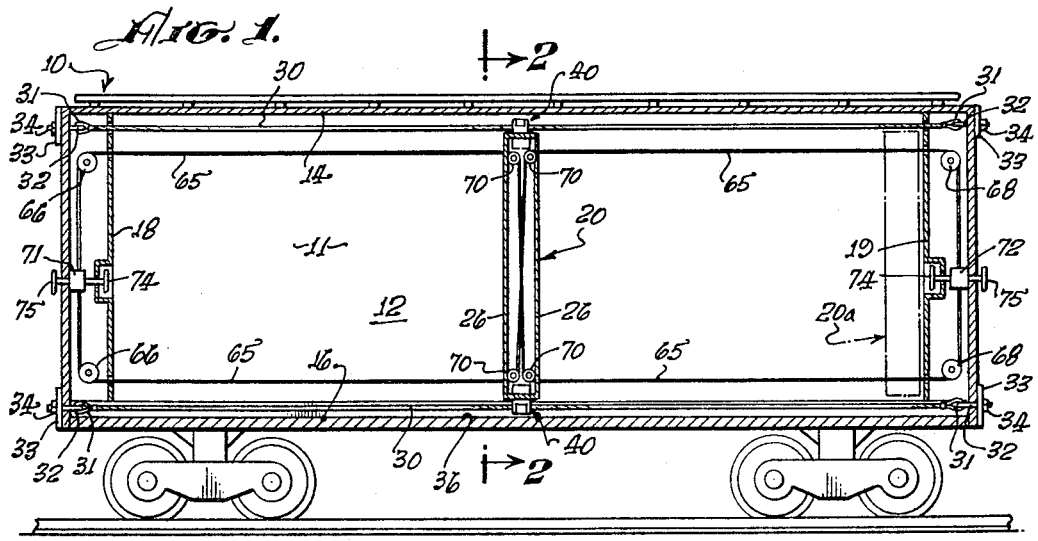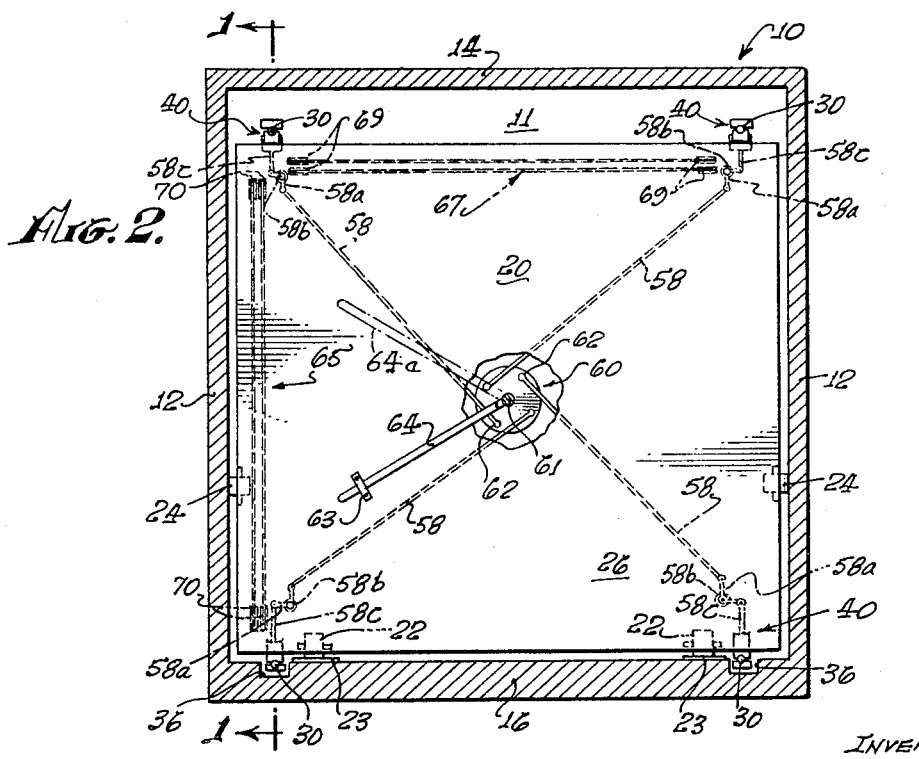

United States Patent Office 3,280,760
Patented Oct. 25, 1966

3,280,760
CABLE SUPPORTED LOAD DIVIDER
Edgar H. Woods, Beverly Hills, and John W. Erickson, Huntington Beach, Calif., assignors to Preco Incorporated, Los Angeles, Calif., a corporation of California
Filed Dec. 11, 1964, Ser. No. 417,603
12 Claims. (Cl. 105—376)

This invention has to do generally with adjustable gates or bulkheads for vehicles for such purposes as dividing the cargo into two or more distinct parts and confining part or all of the cargo to a selected portion of the cargo space.

Such cargo gates or load dividers are useful in railroad cars, highway trucks, aircraft and other types of vehicles.

The present invention is concerned more particularly with reducing the weight and cost of such load dividing gates and their positioning structures, and with facilitating installation of such structures in vehicles.

It is difficult to design load dividers of moderate weight with sufficient strength to resist the relatively violent accelerations to which vehicles are occasionally subject. In many conventional load divider installations rigid rails are mounted longitudinally of the vehicle and are provided at spaced intervals with sprocket-like apertures or other positive locking formations; and the load dividing gate is positively locked to a selected set of such formations on the respective rails. In such installations the rails must be strong enough to withstand large momentary longitudinal stresses which may act either in compression or in tension along the rail. Moreover, the gate structure must be designed to withstand large bending stresses, since longitudinal vehicle shocks are transmitted to the gate with undiminished force by the rigid rail structures and the rigid coupling of the gate to the rails.

The present invention avoids those and other difficulties by locking the gate in the selected longitudinal position in the vehicle by means of flexible cables that are permanently mounted in the car. Four such cables are typically provided, extending the full length of the cargo space close to the corners formed by the side walls with the ceiling and floor. The cables may be recessed into the vehicle structure if desired, but an advantage of the invention is that the relatively small cross-section of the cables normally makes such special vehicle structure unnecessary. In preferred form of the invention, the weight of the gate is not carried by the longitudinal cables, but is supported independently, for example directly on the vehicle floor.

That aspect of the invention greatly reduces the weight of a typical installation. The cables are subject only to tension, and can be far lighter in weight than rigid rails of corresponding strength. Moreover, the very slight longitudinal resilience of a typical cable softens the shocks that would otherwise be transmitted from the vehicle to the gate, permitting the gate itself to be lighter and hence easier to handle.

A further aspect of the invention provides a convenient and effective structure for maintaining a load dividing gate in a desired transverse orientation while being moved longitudinally. That structure is particularly useful in connection with a gate that rolls on the vehicle floor, but may also be used with gates supported in other ways. That structure comprises a system of relatively light flexible cables that extend longitudinally of the vehicle with transverse offset at the gate. Sheaves are preferably provided on the gate at two transversely spaced points for each such cable. Two cables with opposite offsets parallel to a common plane are sufficient to define the orientation of the gate in that plane. Hence four cables can orient the gate in both vertical and horizontal planes. The cables of each pair are preferably formed as a single closed loop, which passes over sheaves mounted at the vehicle ends and is releasably anchored to the vehicle structure. The orientation of the gate can then be adjusted through a limited angular range by releasing the appropriate cable loop, moving it over the vehicle-mounted sheaves, and reanchoring it.

A full understanding of the invention and of its further objects and advantages will be had from the following description of certain illustrative manners of carrying it out. The particulars of that description and of the accompanying drawings, which form a part of it, are intended only as illustration and not as a limitation upon the scope of the invention, which is defined in the appended claims.

In the drawings:

FIG. 1 is a schematic longitudinal vertical section on line 1—1 of FIG. 2, representing an illustrative embodiment of the invention in a railway freight car;

FIG. 2 is a transverse section on line 2—2 of FIG. 1;

FIG. 3 is a detail showing a portion of FIG. 2 at enlarged scale and partially cut away;

FIG. 4 is a section on line 4—4 of FIG. 3; and

FIG. 4A shows the released position of the clamping mechanism illustrated in FIG. 4.

FIG. 5 is a schematic perspective representing a modification.

In the drawings a railway freight car is indicated schematically at 10, with cargo compartment 11 enclosed by the side walls 12, the ceiling 14, the floor 16, and the end walls 18 and 19. A load dividing gate or bulkhead is indicated at 20. The wheels 22 are freely rotatable on bearings mounted on the gate near its lower edge, and roll on car floor 16, preferably on metal tracks 23 fixedly mounted on or set into the floor. The wheels support essentially the entire weight of the gate and facilitate its movement longitudinally of the car between a stowed position against one of the car end walls (shown in dot-dash lines at 20a in FIG. 1) and a working position at any selected point in the car (solid lines). Side rollers 24 may also be mounted on the gate side edges to guide its movement relative to the car side walls.

In accordance with the present invention, the load dividing gate is locked in the selected position by means of fixedly mounted cables 30 that extend longitudinally of the car. As illustratively shown, cables 30 are four in number and extend the entire length of cargo compartment 11. Their ends are secured in any suitable manner to the car frame at end walls 18 and 19, as by use of conventional eyes 31 and shackles 32. The shackles may have threaded shanks that project through the car end wall and are secured to load distributing plates indicated at 33 with nuts 34 for adjusting the cable tension. Cables 30 typically comprise wire rope of conventional type and of such size as to withstand the maximum force that the cargo is expected to exert upon gate 20 under extreme longitudinal acceleration of the car. As an illustration, cables 30 may be standard transmission rope of improved plow steel and of the order of one half to one inch in diameter.

Two of the cables 30 are mounted just below the car ceiling adjacent side walls 12. The other two cables are mounted near the car floor close to the side walls and are preferably received in channels 36 in the car floor so that they can not interfere with movement of cargo or operation of the car doors. Whereas each of the cables, as shown, extends the entire length of the cargo compartment, separate sets of cables may be provided, for example, for the respective end portions of the car.

Clamping mechanism is provided for releasably clamping gate 20 to each of the cables 30. Separate clamping devices 40 are typically mounted on the gate adjacent its respective corners and may be manually operable independently. Alternatively, the operating controls for the respective clamping devices may be linked together to facilitate their simultaneous operation. Many types of clamping mechanisms suitable for this purpose are well known. FIGS. 3 and 4 represent somewhat schematically a particularly effective clamp mechanism. That mechanism is illustrated in a form for clamping the lower cables, but can readily be adapted for clamping the upper cables. A portion of the gate frame is indicated at 25 with facing 26 of sheet metal or the like. The fixed clamping block 41 is fixedly mounted on the gate frame in position to extend into channel 36 in the car floor. The movable clamping block 45 is mounted below block 41 by means of the linkage system indicated generally at 44, and is vertically movable under control of that linkage system to effect clamping and release of cable 30. The lower face of fixed block 41 and the opposing upper face of movable block 45 are channeled generally cylindrically at 42 and 43 parallel to the cable to receive the cable-gripping bushing elements 46 and 47, respectively. The bushing elements have opposing faces that are cylindrically channeled at 48 to fittingly enclose cable 30 (FIG. 3), and are preferably made of a metal, such as mild steel, for example, that is less hard than the cable. The bushing elements 46 and 47 are externally tapered toward both ends at a small angle, typically of the order of five degrees. Channels 42 and 43 in the clamping blocks are correspondingly tapered, and extend with such taper appreciably beyond both ends of the bushing elements, terminating in flange formations 49 which positively limit the longitudinal movement of the bushing elements. Fixed block 41 may carry downwardly extending guide fingers 41a, which constrain block 45 to a definite position longitudinally of the cable while freely permitting its vertical movement for control of the clamping action.

The concave tapered surface of channels 42 and 43 and the mating external tapered surface of the bushing elements may be conically tapered, but are preferably cylindrical in form, the axis of the cylinder being inclined at a small acute angle with respect to the longitudinal cable axis. Thus channel 42, for example, comprises a left portion 42a, which is on the left of mid-plane 44a as seen in FIG. 4, and which is typically circularly cylindrical about the inclined axis 42c; and a right portion 42b which is similarly cylindrical about the inclined axis 42d. Axis 42c is inclined downward to the left, axis 42d downward to the right at equal small angles with respect to the cable axis 30a. The periphery of bushing 46 similarly comprises left and right portions which are cylindrical with respect to the same axes 42c and 42d, respectively. Channel 43 of the movable block, and the outer surface of bushing 47 are typically similarly formed, but with respect to axes that are inclined oppositely with respect to cable axis 30a. The peripheries of bushings 46 and 47 may be centrally relieved as indicated at 46a by a short cylindrical section coaxial about axis 30a. Similar clamping action can be obtained with the surfaces on both sides of mid-plane 44a inclined or tapered in the sense opposite to that shown, so that the bushing elements are of spool form, with their ends of larger diameter than their mid portions. It will also be recognized that channels 42 and 43 need not by cylindrical, but may be of rectangular section, for example, with the channel bottom including two end portions that are oppositely inclined with respect to the cable axis. The bushing elements would then be of corresponding rectangular section.

Linkage mechanism 44 typically comprises the four short links 50 and the four longer links 52, pivotally mounted at 51 and 53 on fixed and movable blocks 41 and 45, respectively, two link pairs on each side of the blocks. The free ends of those links are pivotally connected together in pairs at pivots 54. A short actuating link 55 is also pivoted at each junction 54. The free ends of each pair of links 55 are pivotally connected at 56. The connecting rod 58c carries a head 59 which is pivotally connected at 56 to the actuating links 55 at each side of block 41. The identical linkage structures on each side of the blocks are operated in unison by the single connecting rod 58c, which extends parallel to the plane of the gate and generally perpendicular to cable 30.

The four rods 58c associated with the four clamping mechanisms for the respective cables 30 are preferably operated from a common control mechanism, indicated somewhat schematically at 60 near the center of the gate (FIG. 2). That mechanism comprises a shaft 61 journaled on the gate structure and carrying the four eccentric crank pins 62 on which the rods 58 are respectively pivoted. Each rod 58 is linked to one of the connecting rods 58c via a suitable coupling for changing the thrust direction of the rods. As illustrated, a bellcrank 58a is pivoted on the gate structure at 58b with one of its arms coupled to connecting rod 58c and the other to rod 58. Shaft 61 is manually rotated, as by the radially extending handle 64, between clamping and releasing positions, shown in solid and phantom lines, respectively, operating all the clamping mechanisms in unison. Locking means of any suitable type are provided, as indicated schematically at 63, for locking handle 64 in its clamping position to prevent accidental release of the clamp mechanisms.

In operation of the described clamping mechanisms, longitudinal movement of connecting rod 58c upward from the release position of FIG. 4A to the clamping position of FIGS. 3 and 4 spreads apart the pivot points 54. Block 45 is thereby lifted toward fixed block 41, links 50 acting in compression and links 52 in tension. Those links preferably have a toggle action, the pivot point 54 throwing over center with respect to points 51 and 53, so that the clamping action is inherently locked. Links 55 may also throw over center, as illustrated in FIG. 4 where pivot 56 is above the plane of pivots 54. In clamping position of the mechanism, rod 58 is then not under continuous tension.

The parts are so dimensioned that in the described clamping position bushing elements 46 and 47 are pressed firmly together, frictionally gripping the cable 30. Whereas a linkage mechanism of the general type described may be designed to produce almost any desired degree of direct frictional gripping of the cable, it is generally preferred to supplement that direct gripping action by wedging or camming action such as results from taper of the bushing elements and their enclosing channels. With the described taper, for example, longitudinal cable movement in either direction tends to carry with it the bushing elements, causing those elements to be wedged toward each other by camming action of the oppositely inclined channels 42 and 43. Only moderate force must then be exerted initially by linkage mechanism 44 to obtain effectively positive frictional clamping of the cable. In released position of the linkage (FIG. 4A), block 45 is lowered sufficiently to allow free longitudinal movement of the bushing elements until they are stopped by flange formations 49 without clamping the cable. The clamp structure can then be moved freely along the cable.

To move gate 20 from place to place in the car, all four of the clamp mechanisms 40 are released from their respective cables 30 by swinging handle 64 to releasing position 64a. The gate may then be rolled longitudinally of the car on wheels 22. When the gate has reached the desired position for stowing, or for restraining cargo that has been loaded between the gate and an end wall or between two gates, the four clamps are secured to their cables by operation of handle 64, reliably locking the gate. The tension in the mounted cables 30 is preferably sufficient to practically eliminate cable sag between its mounting points, providing essentially positive positioning of the locked gate.

A further aspect of the invention provides especially economical and convenient means for maintaining a load dividing gate in fixed orientation with respect to the car when it is released for longitudinal movement about the car. The gate is maintained in a vertical plane, for example, by means of the system or orienting cables indicated in FIGS. 1 and 2 at 65. The orienting cables are led over sheaves provided on the gate and preferably also on the end walls of the car, and form a network such that the gate is free to move in translation longitudinally of the car but is normally restrained against rotation. The orienting cables 65 prevent rotation of the gate in the plane of FIG. 1. A similar set of cables is provided to prevent rotation in a horizontal plane. That set does not appear in FIG. 1, but is indicated at 67 in FIG. 2.

Orienting cables 65 typically form a continuous loop supported on two sheaves 66 mounted on end wall 18, two sheaves 68 mounted on end wall 19, and four sheaves 70 mounted on the gate. The two upper sheaves on the gate may be journaled on a common axis, as may the two lower ones, but are shown offset for clarity of illustration. The entire endless cable thus comprises a vertical run at each of the end walls, two vertical runs at the gate, and four horizontal runs between the gate and one or other of the end walls. The gate-mounted sheaves are all freely rotatable. However, means are provided for normally preventing the cable from running over the car-mounted sheaves. For example one of the sheaves at each end of the car may comprise a drum about which the cable makes several turns to provide reliable gripping action, and with means for releasably locking the drum against rotation. As illustrated, all four of the car-mounted sheaves are freely rotatable, and clamping mechanisms 71 and 72 are mounted on the left and right end walls, respectively, for releasably locking the cable against movement relative to the car structure. Those mechanisms may comprise simple screw-actuated clamps, and are preferably controllable either from inside or from outside the car. Operating wheels for controlling the clamps are indicated at 74 and 75, recessed in suitable wells in the car walls.

When clamps 71 and 72 are tight, the cable system 65 may be considered to comprise two independent cables extending from one end wall to the other with vertical offsets in opposite directions at the gate. In fact, it is sometimes preferable to install those two cable portions as separate cables, with their ends mounted on the car walls either directly or via turnbuckles or the like to provide limited adjustment. Alternatively, the pulleys and clamping system may be retained on one end wall, the cable ends being fixedly secured to the other end wall. In any case, when the cables are effectively secured at both end walls, whether by clamping or otherwise, gate 20 may be moved longitudinally of the car, the cables running over their respective gate-supported sheaves 70; but the gate is maintained vertical, since any tendency of the gate to tip is overcome by increased tension in one cable run or the other.

On the other hand, with the present structure, if it is desired to swing the gate one way or the other out of its normal vertical position, that may be accomplished readily by releasing one of the two clamps 71 and 72. Thus, if clamp 72 is released, for example, the gate may be swung to the left (as seen in FIG. 1) about its lower edge. That movement causes the cable run between the two sheaves 68 to move upward over those sheaves through clamp 72. When the desired angle is reached, the gate may be locked at that angle by again tightening clamp 72. The gate is then still free to move longitudinally of the car, maintaining its new orientation. Such adjustability of the gate orientation is useful for obtaining optimum fit of the gate against the cargo that is to be restrained.

For some installations it is sufficient to maintain the gate normally in a vertical plane, as by the cable system just described, without restraining it from rotation about a vertical axis. Such rotation can be controlled manually as the gate is manipulated. However, it is usually convenient to define the gate orientation in both horizontal and vertical planes by means of cable systems. A cable system for orienting the gate about a vertical axis is indicated at 67 in FIG. 2, utilizing four sheaves 69 on the gate, corresponding to the sheaves 70 of the previously described system, and preferably two sheaves (not shown) on each end wall of the car, corresponding to sheaves 66 and 68 of FIG. 1 but mounted on vertical axes. Clamping means corresponding to 71 and 72 are also provided at the car end walls for cable 67, and its operation is similar to that already described except that its plane of operation is horizontal instead of vertical.

FIG. 5 is illustrative of the wide variety of cable networks that may be employed to provide desired types of limitation upon the orientation of a load dividing gate, while permitting its free movement longitudinally of the car. In FIG. 5 the car is indicated schematically in outline at 10 and the gate is similarly shown at 20. As in the previous embodiment, two independent cable loops are employed, each of which is supported on four sheaves on the gate and two sheaves on each of the car end walls. However, the cables are threaded in a different pattern. Cable 80 is carried by gate mounted sheaves 84 and car mounted sheaves 85, while cable 82 is carried by gate mounted sheaves 86 and car mounted sheaves 87. For both cables, the two runs between adjacent car mounted sheaves are vertical, while the two runs between adjacent gate mounted sheaves are oblique in opposite directions, forming a cross. Releasable clamping devices are preferably provided for all four of the vertical cable runs at the car end walls, as indicated schematically at 90. With those clamps tight, the gate orientation is defined in both coordinates. With the clamps released, the gate may be freely tilted out of its normal vertical plane, but still cannot be rotated about a vertical axis. Hence the angle at which the gate crosses the car from side to side is positively defined independently of clamps 90. It can be changed only by lengthening one of the endless cables 80 or 82 and correspondingly shortening the other. It is evident from FIG. 5 that a similar cable network is available, with cable runs at the car ends in a horizontal direction, which will positively define the angle of the gate in a vertical plane while permitting convenient adjustment in a horizontal plane. Such a system is obtained, for example, by rotating the entire system of FIG. 5 through 90 degrees about the longitudinal axis of the car.

Orienting cable systems of the type described are useful not only for orienting gates supported and locked in position as herein described, but are also useful in connection with conventional gate supporting and locking systems.

Two of the main cables 30 may comprise, for example, a single length of wire rope, with both ends secured to the same car end, and led over spaced sheaves or other guide means at the other car end. Such a structure will be referred to for convenience as "two cables," even though the two cable runs are not fully independent. It is ordinarily more convenient and economical to mount the respective cable runs independently. Whereas four cables have been shown for illustration, three cables are sufficient to define the longitudinal position of a gate. More than four cables may be provided, thereby reducing the strength required of each cable.

In some installations, rails or other suitable structures are available at the top or bottom of the car, to which the gate may be releasably locked in conventional fashion. In accordance with the present invention, cables may be provided for locking the parts of such gates that are remote from any other fastening means. For example, in FIGS. 1 and 2 the main cables in channels 36 may be replaced by rails of conventional type with sprocket holes to which the gate is lockable by pins or similar known means. The upper two cables 60 then function as already described to complete the locking of such a gate. Orienting cables of the type described may be employed in such installations, if desired.

The invention has been described with primary reference to a single gate extending the entire width of the car. It is equally applicable to the so-called half-gates, additional cables being provided as required. Two or more gates may be used at different longitudinal positions in the car, locked in position by the same main cables or by distinct sets of main cables, as preferred. It is ordinarily preferable to provide a separate set of orienting cables for each such gate.

The cables do not need to extend all the way to the end walls as illustratively shown, provided the free run of each cable between its mounting points is sufficient to accommodate the entire required range of gate movement. For example, if separate gates are movable from the respective car end walls approximately to the center of the car, the cables for each gate may be supported at one end on or near the end wall and at the other end on bracket structure of any suitable type at the center of the car. In general, the mounting points of each cable are spaced beyond the opposite ends of the longitudinal movement range of the gate.

We claim:

1. A load dividing system for a vehicle cargo compartment having two spaced end walls, comprising in combination
   a load dividing gate mounted in the compartment for movement longitudinally of the compartment between a stowed position adjacent one end wall and a plurality of working positions spaced therefrom,
   a plurality of flexible cables,
   means for mounting opposite ends of each cable in fixed relation to the vehicle at points thereof that are mutually spaced in a direction parallel to the gate movement, with the cables extending under continuous tension in free runs between said mounting points in mutually spaced parallel relation,
   and means on the gate for releasably gripping the tensioned cables at variable points within said cable runs to releasably lock the gate in a selected position longitudinally of the compartment.

2. A load dividing system for a vehicle cargo compartment having two spaced end walls, comprising in combination
   a load dividing gate mounted in the compartment for movement longitudinally of the compartment,
   a plurality of flexible cables,
   means for mounting opposite ends of each cable in fixed relation to the vehicle at points thereof that are mutually spaced in a direction parallel to the gate movement, with the cables extending under continuous tension in free runs between said mounting points in mutually spaced parallel relation,
   and means on the gate for releasably gripping the respective tensioned cables at variable points within said cable runs, each said gripping means comprising a plurality of members mounted on the gate and spacedly surrounding the cable, cable contacting elements between the respective members and the cable, the elements and the members having mutual contact faces that extend longitudinally of the cable and are inclined at a small acute angle with respect to the length of the cable, and control means for forcibly moving the members toward each other to grip the cable between the cable contacting elements.

3. A load dividing system as defined in claim 2, and wherein said mutual contact faces of the elements and the members include opposite end portions that are oppositely inclined at small acute angles with respect to the length of the cable.

4. A load dividing system for a vehicle cargo compartment having two spaced end walls, comprising in combination
   a load dividing gate,
   means mounting the gate in the compartment for movement longitudinally of the compartment through a predetermined movement range,
   a plurality of flexible cables,
   means for fixedly mounting the cables in the compartment and extending longitudinally of said gate movement in mutually spaced parallel relation, each cable extending under continuous tension in a free run between mounting points fixed with respect to the compartment and spaced beyond the opposite ends of said movement range,
   and means on the gate for releasably gripping the mounted cables at respective points thereof that are continuously variable longitudinally within said free runs throughout said movement range to releasably lock the gate in a selected position longitudinally of the compartment.

5. A load dividing system as defined in claim 4,
   said gate mounting means including rollers journaled on the gate on axes parallel to the floor and to the plane of the gate and adapted to support the gate relative to the car floor,
   and means actuable to prevent rotation of the gate about a horizontal axis parallel to the plane of the gate while the gate weight is fully supported by the rollers.

6. A load dividing system as defined in claim 5, and wherein said rotation preventing means comprise
   a pair of flexible orienting cables,
   means for fixedly mounting the opposite ends of each orienting cable on the vehicle at respective mounting points that are spaced longitudinally of said gate movement beyond the respective limits of the movement range and are offset transversely of the gate movement, the direction of said offset being essentially opposite for the two cables,
   and cable guide means for each orienting cable including a pair of sheaves journaled for free rotation on the gate in longitudinal alinement with the respective mounting points of the cable,
   whereby each mounted orienting cable extends parallel to said gate movement on opposite sides of the gate between its respective sheaves and mounting points and extends transversely of the gate movement between its two gate mounted sheaves.

7. A load dividing system for a vehicle cargo compartment having a floor, spaced side walls and spaced end walls, comprising in combination
   a load dividing gate,
   means mounting the gate in the compartment generally parallel to the end walls for movement longitudinally of the compartment through a predetermined movement range,
   structure forming two channels in the compartment floor parallel to and adjacent the respective side walls,
   a flexible cable mounted under tension in each of the channels and extending in a free run between fixed mounting points spaced beyond the opposite ends of said movement range,
   means on the gate for releasably gripping the cables within the channels at respective points that are continuously variable within said runs to releasably lock the gate at a selected position longitudinally of the compartment,
   and means actuable to prevent rotation of the locked gate about a horizontal axis.

8. A load dividing system as defined in claim 7, and wherein
   said rotation preventing means comprise
   at least one additional cable, means mounting the additional cable under tension in the compartment extending in a free run parallel to the gate movement and spaced above the compartment floor between mounting points spaced beyond the opposite ends of said movement range, and means on the gate for releasably gripping the additional cable at a continuously variable point thereof.

9. In combination with a load dividing gate that is adapted to be supported transversely of a cargo compartment of a vehicle and is movable longitudinally thereof through a predetermined movement range and is lockable in a selected position within that range, means for defining the orientation of the gate with respect to the vehicle during said gate movement, said means comprising a pair of flexible cables, means for fixedly mounting the opposite ends of each cable on the vehicle at respective mounting points that are spaced longitudinally of said gate movement beyond the respective limits of the movement range and are offset transversely of the gate movement, the direction of said offset being essentially opposite for the two cables, and cable guide means for each cable including a pair of sheaves journaled for free rotation on the gate in longitudinal alinement with the respective mounting points of the cable, whereby each mounted cable extends parallel to said gate movement on opposite sides of the gate between its respective sheaves and mounting points and extends transversely of the gate movement between its two sheaves.

10. The combination defined in claim 9 and wherein said cable mounting means include means actuable to simultaneously and equally slacken one cable of the pair and tighten the other cable of the pair.

11. In combination with a load dividing gate that is adapted to be supported transversely of a cargo compartment of a vehicle and is movable longitudinally thereof through a predetermined movement range and is lockable in a selected position within that range, means for defining the orientation of the gate with respect to the vehicle during said gate movement, said means comprising two pairs of flexible cables, means for fixedly mounting the opposite ends of each cable on the vehicle at respective mounting points that are spaced longitudinally of said gate movement beyond the respective limits of the movement range and are offset transversely of the gate movement, the direction of said offset being essentially opposite for the two cables of each pair, and the offset for the cables of one pair being approximately perpendicular to the offset for the cables of the other pair, and cable guide means for each cable including a pair of sheaves journaled for free rotation on the gate in longitudinal alinement with the respective mounting points of the cable, whereby each mounted cable extends parallel to said gate movement on opposite sides of the gate between its respective sheaves and mounting points and extends transversely of the gate movement between its two sheaves.

12. The combination defined in claim 11 and wherein said cable mounting means include means actuable independently for each pair of cables to simultaneously and equally slacken one cable of the pair and tighten the other cable of the pair.

References Cited by the Examiner

UNITED STATES PATENTS

| 2,752,864 | 7/1956 | McDougal et al. | 105—376 |
| 2,760,445 | 8/1956 | Beckett | 105—376 |
| 3,108,547 | 10/1963 | Shaver | 105—376 |

ARTHUR L. LA POINT, *Primary Examiner.*

DRAYTON E. HOFFMAN, *Examiner.*